US012567229B2

(12) United States Patent
Yousfi

(10) Patent No.: US 12,567,229 B2
(45) Date of Patent: Mar. 3, 2026

(54) METHOD FOR DETERMINING THE SOLAR DISTRIBUTION IN AN AREA

(71) Applicant: TotalEnergies OneTech, Courbevoie (FR)

(72) Inventor: Sonia Yousfi, Orsay (FR)

(73) Assignee: TotalEnergies OneTech, Courbevoie (FR)

( * ) Notice: Subject to any disclaimer, the term of this patent is extended or adjusted under 35 U.S.C. 154(b) by 346 days.

(21) Appl. No.: 18/031,411

(22) PCT Filed: Oct. 19, 2021

(86) PCT No.: PCT/EP2021/078977
§ 371 (c)(1),
(2) Date: Apr. 12, 2023

(87) PCT Pub. No.: WO2022/084328
PCT Pub. Date: Apr. 28, 2022

(65) Prior Publication Data
US 2023/0386171 A1 Nov. 30, 2023

(30) Foreign Application Priority Data
Oct. 19, 2020 (EP) ..................................... 20306237

(51) Int. Cl.
G06V 10/60 (2022.01)
G01W 1/12 (2006.01)
(Continued)

(52) U.S. Cl.
CPC ............... G06V 10/60 (2022.01); G01W 1/12 (2013.01); G06V 10/26 (2022.01); G06V 10/774 (2022.01); G06V 20/176 (2022.01)

(58) Field of Classification Search
None
See application file for complete search history.

(56) References Cited

U.S. PATENT DOCUMENTS 7,305,983 B1 12/2007 Meder et al.
10,366,287 B1 * 7/2019 Loveland ............... G06V 20/17
(Continued)

FOREIGN PATENT DOCUMENTS

JP 2018143071 A 9/2018
JP 6578458 B1 9/2019
(Continued)

OTHER PUBLICATIONS

"Estimation of Rooftop Solar Energy Generation Using Satellite Image Segmentation"; Sampath et al; 9th International Conference on Advanced Computing (IACC); Dec. 1, 2019; pp. 38-44. (Year: 2019).*

(Continued)

*Primary Examiner* — David Ometz
(74) *Attorney, Agent, or Firm* — Troutman Pepper Locke LLP

(57) ABSTRACT

The present invention concerns a method for determining the solar distribution in an area, the including, a phase for collecting data to form a training database, a phase for training a model on the basis of the training database to obtain a trained model, the input of the trained model being an image of an area seen from the sky and the output being a global cartography of the irradiance projected on each surface of the area imaged on the input image, and a phase for operating the trained model. The phase for operating the trained models includes, a step of receiving an image of an area seen from the sky, and a step of determining by the trained model a global cartography of the irradiance projected on each surface of the area imaged on the received image.

11 Claims, 4 Drawing Sheets

(51) Int. Cl.
    *G06V 10/26*        (2022.01)
    *G06V 10/774*     (2022.01)
    *G06V 20/10*       (2022.01)

(56)            References Cited

U.S. PATENT DOCUMENTS

| | | |
|---|---|---|
| 10,754,999 B1 | 8/2020 | Vratimos et al. |
| 2012/0191351 A1 * | 7/2012 | Kerrigan ................. H02J 3/004 |
| | | 702/3 |

FOREIGN PATENT DOCUMENTS

| | | | | |
|---|---|---|---|---|
| WO | WO-2007127864 A2 * | 11/2007 | ............. | G06F 30/20 |
| WO | WO-2017035398 A1 * | 3/2017 | ........... | G06V 20/176 |
| WO | WO-2017193172 A1 * | 11/2017 | ............... | G06N 5/01 |

OTHER PUBLICATIONS

Extended European Search Report issued in European Patent Application No. 20 30 6237 mailed Apr. 1, 2021.

International Search Report issued in International Patent Application No. PCT/EP2021/078977 mailed Jan. 14, 2022.

Written Opinion issued in International Patent Application No. PCT/EP2021/078977 mailed Jan. 14, 2022.

Lee, S. et al. "DeepRoof: A Data-driven Approach for Solar Potential Estimation Using Rooftop Imagery" Applied Data Science Track Paper, pp. 2105-2113 (2019).

Notice of Reasons for Refusal with English translation dated Jul. 25, 2025, from corresponding Japanese Application No. JP2023523517.

* cited by examiner

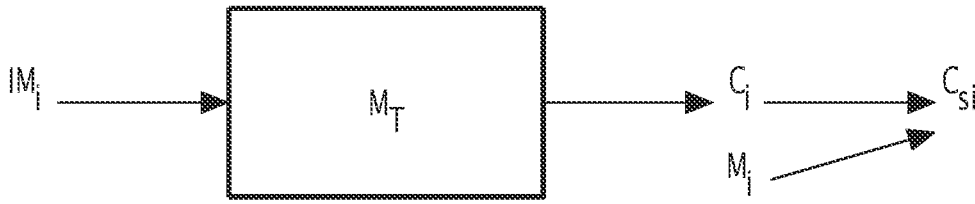
$$\text{FIG.4}$$

1

METHOD FOR DETERMINING THE SOLAR DISTRIBUTION IN AN AREA

CROSS REFERENCE TO RELATED APPLICATIONS

The present application is a U.S. National Phase application under 35 U.S.C. § 371 of International Patent Application No. PCT/EP2021/078977 filed Oct. 19, 2021, which claims priority of European Patent Application No. 20306237.7 filed Oct. 19, 2020. The entire contents of which are hereby incorporated by reference.

FIELD OF THE INVENTION

The present invention concerns a method for determining the solar distribution in an area. The present invention also concerns an associated computer program product.

BACKGROUND

Producing electricity from renewable energy is a current issue for our societies. This has entailed the development of specific installations such as solar panels which enable producing solar electricity. Solar panels are typically installed on specific zones of an area, such as on the roofs, on the walls, on the terraces of a building, or on the ground.

In order to support the development of solar installations, tools have been developed to estimate the solar distribution in an area while taking into consideration the shape and exposure of specific zones for these solar installations. These tools aim at improving the repartition of solar panels in an area to increase the production of solar electricity. They are also used to encourage individuals and communities to invest in solar panels by showing them the solar potential of their area.

Such tools typically use three-dimensional data of the corresponding area to evaluate the solar distribution in an area However, three-dimensional data are not available for every part of the world. In addition, a three-dimensional reconstruction requires costly resources. Hence, the current tools are not easily usable for every part of the world.

There is therefore a need for a tool enabling to determine the solar distribution in an area wherever in the world in an easiest way.

SUMMARY

To this end, the invention relates to a method for determining the solar distribution in an area, the method being implemented by a computer and comprising:

a. a phase for collecting data to form a training database, the collected data comprising at least:
  i. a plurality of images of different areas seen from the sky, at least some of the areas comprising specific elements suitable for the installation of solar panels, and
  ii. for each image, a global cartography of the irradiance projected on each surface of the area imaged on the image,
b. a phase for training a model on the basis of the training database to obtain a trained model, the only input of the trained model being a single two-dimensional image of an area seen from the sky and the output being a global cartography of the irradiance projected on each surface of the area imaged on the input image,

c. a phase for operating the trained model comprising:
  i. a step of receiving a two-dimensional image to be analyzed of an area seen from the sky, and
  ii. a step of determining, by the trained model, a global cartography of the irradiance projected on each surface of the area imaged on the image to be analyzed.

The method according to the invention may comprise one or more of the following features considered alone or in any combination that is technically possible:

the collected images and analyzed images are obtained by a sensor, such as a camera, or by a satellite.

the collected data also comprise, for each image, a mask segmenting the specific element(s) imaged on the image.

the method comprises a phase for determining solar data relative to the specific element(s) imaged on the analyzed image on the basis of the determined global cartography and of complementary data, the complementary data comprising, for example, weather data of the area and/or solar panels data and/or location data of the area.

the determining phase comprises for each analyzed image:
  a. a step of determining a mask segmenting the specific element(s) imaged on the image, and
  b. a step of determining a specific cartography of the irradiance projected on only the specific element(s) imaged on the image on the basis of the global cartography and of the determined mask, the solar data of the zone of the area being determined on the basis of the specific cartography.

the solar data comprises at least one data among the solar potential of the specific element(s) imaged on the image to be analyzed and the yield of a solar installation that would be installed on the specific element(s).

the collecting phase comprises a step of applying a filter on the collected images in order to obtain images with a reduced resolution, the images forming the training database being the images with the reduced resolution.

the method comprises a phase for designing and/or setting up solar panels in a zone of the area imaged on the image to be analyzed, on the basis of the obtained global cartography.

the specific elements are chosen among: the roof of a building, the terrace of a building and a specific portion of the ground, such as a field or a garden.

The invention also relates to a computer program product comprising a computer readable medium, having thereon a computer program comprising program instructions, the computer program being loadable into a data-processing unit and causing execution of the previously described method when the computer program is run by the data-processing unit.

BRIEF DESCRIPTION OF THE DRAWINGS

The invention will be easier to understand in view of the following description, provided solely as an example and with reference to the appended drawings in which:

FIG. 4 is a schematic representation of the input and output of a trained model.

DETAILED DESCRIPTION OF THE DRAWINGS

Figure 1:
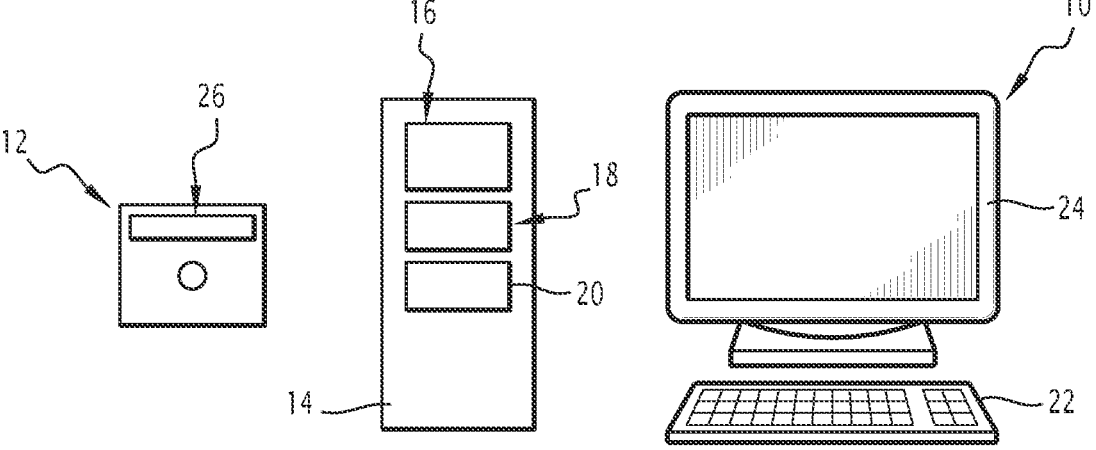
FIG. 1 is a schematic view of an example of a calculator allowing the implementation of a method for determining the solar distribution in an area.

A calculator 10 and a computer program product 12 are illustrated on FIG. 1.

The calculator 10 is preferably a computer.

More generally, the calculator 10 is a computer or computing system, or similar electronic computing device adapted to manipulate and/or transform data represented as physical, such as electronic, quantities within the computing system's registers and/or memories into other data similarly represented as physical quantities within the computing system's memories, registers or other such information storage, transmission or display devices.

The calculator 10 interacts with the computer program product 12.

As illustrated on FIG. 1, the calculator 10 comprises a processor 14 comprising a data processing unit 16, memories 18 and a reader 20 for information media. In the example illustrated on FIG. 1, the calculator 10 comprises a human machine interface 22, such as a keyboard, and a display 24.

The computer program product 12 comprises an information medium 26.

The information medium 26 is a medium readable by the calculator 10, usually by the data processing unit 16. The readable information medium 26 is a medium suitable for storing electronic instructions and capable of being coupled to a computer system bus.

By way of example, the information medium 26 is a USB key, a floppy disk or flexible disk (of the English name "Floppy disc"), an optical disk, a CD-ROM, a magneto-optical disk, a ROM memory, a memory RAM, EPROM memory, EEPROM memory, magnetic card or optical card.

On the information medium 26 is stored the computer program 12 comprising program instructions.

The computer program 12 is loadable on the data processing unit 16 and is adapted to entail the implementation of a method for determining the solar distribution in an area when the computer program 12 is loaded on the processing unit 16 of the calculator 10.

Figure 2:
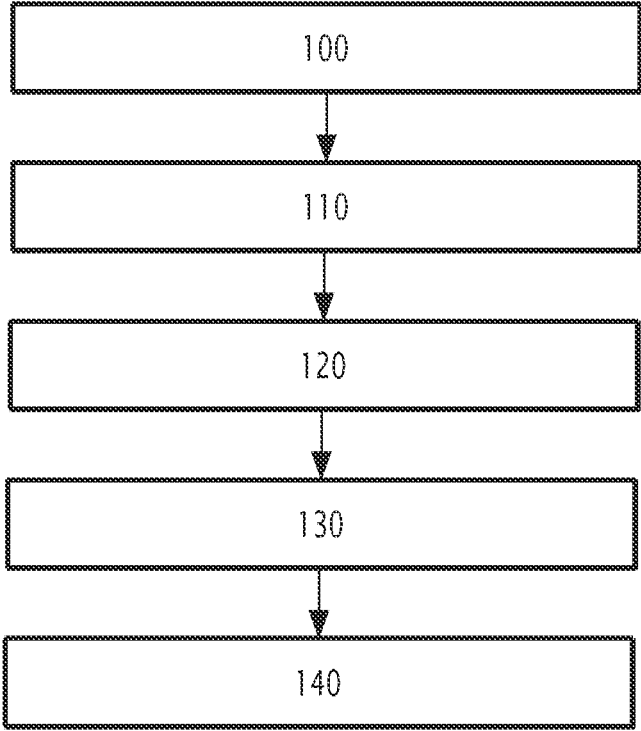
FIG. 2 is a flow diagram of an example of implementation of a method for determining the solar distribution in an area.
Figure 3:
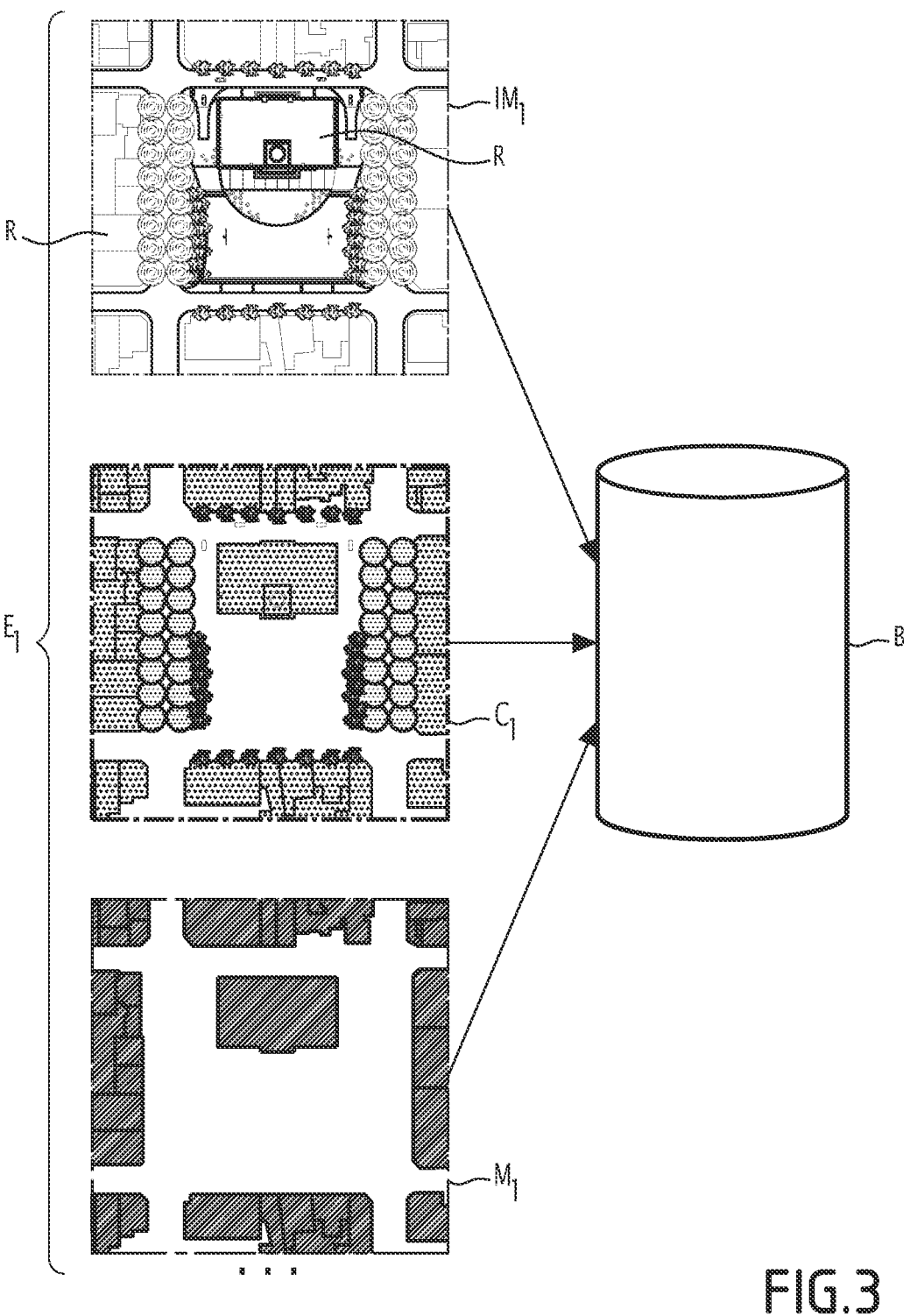
FIG. 3 is a schematic representation of collected data forming a training database.

Operation of the calculator 10 will now be described with reference to FIG. 2, which diagrammatically illustrates an example of implementation of a method for determining the solar distribution in an area, and to FIGS. 3 and 4 which illustrate in more detail certain phases of this method.

The determination method comprises a phase 100 for collecting data to form a training database B. The collecting phase 100 is implemented by the calculator 10 in interaction with the computer program product 12, that is to say is implemented by a computer.

The collected data comprise a plurality of images IM1, . . . , IMn of different areas seen from the sky. By the term "seen from the sky", it is understood that the images IM1, . . . , IMn have been taken from an elevated view, which enables imaging the rooftop of a building for example.

At least some of the areas imaged on the images IM1, . . . , IMn comprise specific element(s) R suitable for the installation of solar panels. The specific elements R are, for example, chosen among; the roof of a building, the terrace of a building or a specific portion of the ground, such as a garden.

The images IM1, . . . , IMn are preferably only images in two-dimensions. The images IM1, . . . , IMn are preferably color images, such as RGB images (abbreviation of "Red Green Blue"). The images IM1, . . . , IMn are, for example, obtained by a sensor, such as a camera. To acquire the images IM1, . . . , IMn, the sensor is, for example, mounted on an aircraft. In a variant, the images IM1, . . . , IMn are satellite images.

In a specific embodiment, a filter is applied on the collected images IM1, . . . , IMn in order to obtain images with a reduced resolution, the images IM1, . . . , IMn forming the training database B being the images with the reduced resolution. Preferably, the reduced resolution is such that each pixel of the image corresponds to a real dimension inferior to 50 centimeters. This enables to obtain images IM1, . . . , IMn with a resolution comparable to the resolution of images that can be easily found in several databases.

The collected data also comprise, for each image IM1, . . . , IMn, a global cartography C1, . . . , Cn of the irradiance projected on each surface of the area imaged on the image IM1, . . . , IMn. The irradiance, expressed in Watt per square meter ($W/m^2$), is the incident radiant flux (power) received by a surface per unit area. The projected irradiance, expressed in Watt per square meter ($W/m^2$), is the irradiance corrected of near and far shadowing and which takes into account the geometry and/or shape of the surface of projection (roofs).

For example, each cartography C1, . . . , Cn was obtained on the basis of specific measurements taken by sensors in the area corresponding to the corresponding image IM1, . . . , IMn. The sensors are for example pyranometers. A pyranometer is a heat flux sensor. It measures the total solar radiation power in watts per square meter.

In another example, each cartography C1, . . . , Cn was obtained on the basis of existing tools outputting the cartography C1, . . . , Cn as a function of three-dimensional images of the area corresponding to the image IM1, . . . , IMn. Mapdwell and Google's Project Sunroof are examples of such tools.

Optionally, the collected data further comprise, for each image IM1, . . . , IMn, a mask M1, . . . , Mn segmenting the specific element(s) R imaged on the image IM1, . . . , IMn. The segmentation mask M1, . . . , Mn was for example obtained from a segmentation algorithm applied on the initial image IM1, . . . , IMn. The segmentation algorithm is, for example, an edge detection algorithm.

Each image IM1, . . . , IMn and its associated cartography C1 . . . , Cn and, if applicable, its mask M1, . . . , Mn, forms a training element E1, . . . , En. Each training element E1, . . . , En is at most formed of these three components. An example of a training element E1 comprising an image IM1, a cartography C1 and a mask M1, is illustrated on FIG. 3.

The obtained training database B is, for example, stored in a memory 18 of the computer 10.

The determination method comprises a phase 110 for training a model on the basis of the training database B to obtain a trained model $M_T$. Preferably, the model is trained end-to-end using only the training database B. The training phase 110 is implemented by the calculator 10 in interaction with the computer program product 12, that is to say is implemented by a computer.

As illustrated on FIG. 4, the input of the trained model $M_T$ is an image IMi of an area seen from the sky and the output is a global cartography Ci of the irradiance projected on each surface of the area imaged on the input image IMi. Preferably, the only input of the trained model $M_T$ is a single two-dimensional image, preferably in color, of an area, and there is no need of three-dimensional images of the area or of several two-dimensional images of the same portion of an area.

The model is typically a deep-learning model. Such a model is, for example, a neural network, such as a convolution neural network.

The model is typically trained according to a training technique. The training technique implements, for example, a supervised learning. The training technique makes it possible to configure the neural network as the neural network is trained on the basis of the training database B. It is highlighted that the model is trained only on the basis of the training database B. The training technique is for example based on an Adam optimization algorithm.

In the determination of the projected irradiance, the training of the model on the basis of the training database B enables taking into account the nearby environment, such as the shadow coming from buildings or the vegetation and all kind of obstacles obstructing parts of the specific element R. The training also enables taking into account geometrical features of the specific elements, for example the roofs.

Hence, in one embodiment, the model is a deep leaning model trained end-to-end to map two dimensional images to projected irradiance, without the need to estimate three dimensional attributes even in an intermediate step. The training enables therefore a direct estimation of the projected irradiance from two dimension images only, without intermediate steps, while being able to take into consideration three dimensional aspects (shape, obstruction, shadowing).

In one example, part of the training database B is used to configure the neural network and the other part to validate the configuration.

The determination method comprises a phase 120 for operating the trained model $M_T$. The operating phase 120 is implemented by the calculator 10 in interaction with the computer program product 12, that is to say is implemented by a computer.

The operating phase 120 comprises a step of receiving an image IMi of an area seen from the sky. Advantageously, the image IMi of the area to be evaluated is a two-dimensional image, preferably in color, for example obtained via a measurement by a sensor, such as a camera, or by a satellite. The image IMi is for example an image of a building seen from the sky.

The operating phase 120 then comprises a step of determining by the trained model $M_T$ a global cartography Ci of the irradiance projected on each surface of the area imaged on the received image IMi.

Hence, the person skilled in the art will understand that the model is first trained on the basis of existing irradiance cartographies during the training phase 110. Then, the current operating phase 120 enables to determine an unknown irradiance cartography with the trained model $M_T$.

Optionally, the determination method comprises a phase 130 for determining solar data relative to the specific element(s) R imaged on the analyzed image IMi on the basis of the determined global cartography Ci and of complementary data. The determining phase 130 is implemented by the calculator 10 in interaction with the computer program product 12, that is to say is implemented by a computer.

In an embodiment, the solar data comprises at least one data among the solar potential of the specific element(s) R imaged on the image IMi to be analyzed and the yield of a solar installation that would be installed on the specific element(s) R. The solar potential is the solar power received on a zone in kilowatt per hour per year (kW/hours/year). The yield is the ratio between the energy produced (kWh) and the theoretical power (KWp) of the installation.

Preferably, the complementary data comprise weather data of the area, and/or solar panels data and/or location data of the area.

The weather data are for example the weather data during a period, such as a year. The solar panels data are for example the specific technology of the solar panels and the dimensions of these solar panels. The location data are for example the latitude and longitude of the area.

In an example, the determining phase 130 comprises a step for determining a mask Mi segmenting the specific element(s) R imaged on the image IMi. The segmentation mask Mi was for example obtained from a segmentation algorithm applied on the initial image IMi. The segmentation algorithm is, for example, an edge detection algorithm.

Then, as illustrated on FIG. 4, the determining phase 130 comprises a step for determining a specific cartography Csi of the irradiance projected on only the specific element(s) R imaged on the image IMi on the basis of the global cartography Ci and of the determined mask Mi. For example, if the specific elements R are roofs of buildings, the specific cartography Csi only represents the irradiance projected on the roofs.

Optionally, the specific cartography Csi is displayed on a display, for example the display 24 of the calculator 10, which enables a user to control the determined irradiance.

The determining phase 130 comprises also a step of determining solar data on the basis of the specific cartography Csi.

Optionally, the determination method comprises a phase 140 for designing and/or setting up a solar panels installation in the zone of the area for which a global cartography has been obtained, on the basis of said obtained global cartography.

The described method enables to optimize a model which learns the estimation of the irradiance projected on specific elements (such as roofs) directly from two-dimensional images. The end-to-end training avoids error accumulation which could be the case when the tasks are split into 3D attribute estimation, segment detection and shadow heuristics.

This enables obtaining solar information even in areas where only few data are available and especially no three-dimensional data. It also allows a quick first estimation of solar potential. The obtained irradiance and solar data enable to help in the determination of suitable solar installation for an area.

The person skilled in the art will understand that the embodiments and variants described above can be combined to form new embodiments provided that they are technically compatible.

The invention claimed is:

1. A method for determining the solar distribution in an area, the method being implemented by a computer and comprising:
   a. a phase collecting data to form a training database, the collected data comprising at least:
      i. a plurality of images of different areas seen from the sky, at least some of the areas comprising specific elements suitable for the installation of solar panels, and
      ii. for each image, a global cartography of the irradiance projected on each surface of the area imaged on the image,
   b. a phase training a model on the basis of the training database to obtain a trained model, the only input of the trained model being a single two-dimensional image of an area seen from the sky and the output being a global cartography of the irradiance projected on each surface of the area imaged on the input image, c. a phase operating the trained model comprising:

i. a step of receiving a two-dimensional image to be analyzed of an area seen from the sky, and ii. a step of determining by the trained model a global cartography of the irradiance projected on each surface of the area imaged on the image to be analyzed.

2. The method according to claim 1, wherein the collected plurality of images and analyzed images are obtained by a sensor, such as a camera, or by a satellite.

3. The method according to claim 1, wherein the collected data also comprise, for each image of the plurality of images, a mask segmenting the specific element(s) imaged on the plurality of images.

4. The method according to claim 1, wherein the method comprises a phase determining solar data relative to the specific element(s) imaged on the analyzed image on the basis of the determined global cartography and of complementary data.

5. The method according to claim 4, wherein the determining phase comprises for each analyzed image:

a. a step of determining a mask segmenting the specific element(s) imaged on the analyzed image, and b. a step of determining a specific cartography of the irradiance projected on only the specific element(s) imaged on the analyzed image on the basis of the global cartography and of the determined mask, the solar data of the zone of the area being determined on the basis of the specific cartography.

6. The method according to claim 4, wherein the solar data comprises at least one data among the solar potential of the specific element(s) imaged on the image to be analyzed and the yield of a solar installation that would be installed on the specific element(s).

7. The method according to claim 4, wherein the complementary data comprise weather data of the area and/or solar panels data and/or location data of the area.

8. The method according to claim 1, wherein the collecting phase comprises a step of applying a filter on the collected images in order to obtain images with a reduced resolution, the images forming the training database being the images with the reduced resolution.

9. The method according to claim 1, wherein the method comprises a phase for designing and/or setting up solar panels in a zone of the area imaged on the image to be analyzed, on the basis of the obtained global cartography.

10. The method according to claim 1, wherein the specific elements are chosen among: the roof of a building, the terrace of a building and a specific portion of the ground, such as a field or a garden.

11. A non-transitory computer readable storage medium comprising a computer program being loadable into a data-processing unit and causing execution of a method according to claim 1 when the computer program is run by the data-processing unit.

\* \* \* \* \*